Jan. 27, 1959
R. V. LESTER
2,871,411
HOT-START DEVICE FOR A. C. WELDERS
Filed Oct. 9, 1953
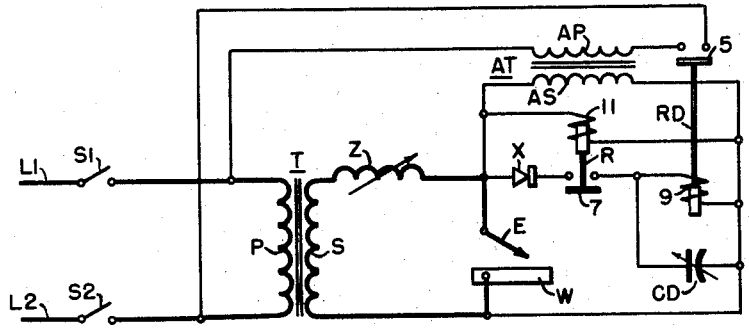
Fig. 1.
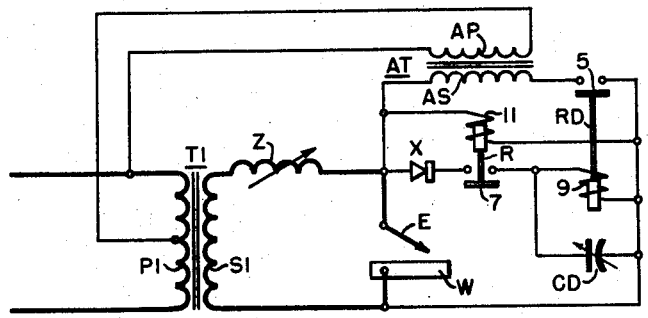
Fig. 2.
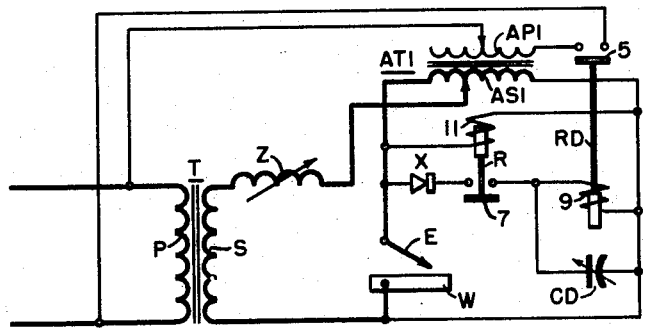
Fig. 3.
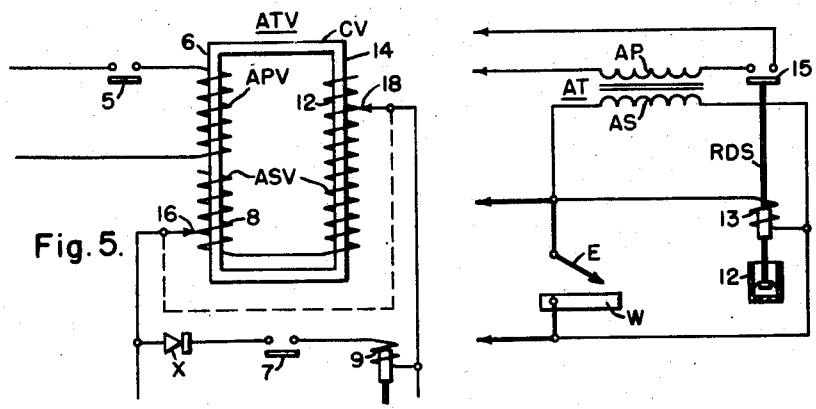
Fig. 5.
Fig. 4.

United States Patent Office 2,871,411
Patented Jan. 27, 1959

2,871,411

HOT-START DEVICE FOR A. C. WELDERS

Ray V. Lester, Kenmore, N. Y., assignor to Westinghouse Electric Corporation, East Pittsburgh, Pa., a corporation of Pennsylvania Application October 9, 1953, Serial No. 385,067

9 Claims. (Cl. 315—176)

My invention relates to electric discharge apparatus and has particular relation to arc welding apparatus. The expression arc welding as used in this application is taken to have not only its ordinary meaning, the joining of metals by means of an arc between an electrode and work, but is intended to comprehend within its scope, under the appropriate circumstances, other operations involving an arc, such as arc cutting, arc heating and arc melting or casting.

In arc welding apparatus it is advantageous to derive the current for welding from a source having high impedance, as a high impedance source tends to maintain the stability of the welding arc. Thus, where the supply is of the alternating current type, the impedance of the transformer through which the welding current is supplied is preferably high. In addition, since the welding operator is usually in contact with the electrode or the work and it is desirable to protect the operator from electrical shock, the open circuit voltage available between the electrode and the work should be as low as practicable. An open circuit potential of 80 volts R. M. S. has been set as the safe upper limit by a committee of the National Electric Manufacturers Association.

Because of the conditions imposed by the high impedance supply and by the safety requirements, difficulty is sometimes encountered in starting the arc at the beginning of a welding operation. To overcome this difficulty, welding apparatus in accordance with the teachings of the prior art, includes means for facilitating the starting of the arc and such means is referred to as hot start. Typical of such hot start means are those disclosed in Eschholz Patents 1,343,199, 1,343,201, 1,343,207, Holslag Patent 1,549,874, White Patent 2,365,611 (particularly Figs. 5 and 7) and Landis Patent 2,465,596.

A study of this prior art apparatus reveals that while the hot start means disclosed in these references may, under certain circumstances, operate satisfactorily, it has deficiencies. Such hot-start facilities as those disclosed in the Eschholz patents depend on an increase in the voltage of the supply during the start of a welding operation and tend to be unsafe to operating personnel at a time when the safety should be the highest. The other apparatus is complex and costly and because of its complexity has a tendency to fail frequently so that there is loss of the use of the apparatus and high servicing cost.

It is, accordingly, an object of my invention to provide an arc welder including hot start means of simple, rugged and low cost structure requiring a minimum of servicing.

A more specific object of my invention is to provide an arc welder including hot-start means which shall not involve hazard to operating personnel.

Another specific object of my invention is to provide an arc welder with reliable hot-start means which shall operate without an increase in the open-circuit voltage between the electrode and the work during starting.

An incidental object of my invention is to provide a novel relay circuit.

Another incidental object of my invention is to provide a novel transformer.

In accordance with the broader aspects of my invention, I provide arc welding apparatus including in addition to the main supply which provides the current for welding, an auxiliary supply and means for connecting this auxiliary supply between the electrode and the work in parallel with the main supply for a short time interval during the start of a welding operation. The auxiliary supply is connected between the electrode and the work in such manner that its electrical effect is cumulative with that of the main supply so that both operate together to facilitate starting. Thus, in alternating current welding, the main supply includes a transformer and the auxiliary supply includes an auxiliary transformer. The secondary of the main transformer is connected between the electrode and the work, and the secondary of the auxiliary transformer is connected in parallel with the main transformer during the starting operation. The main and auxiliary transformers are so wound and connected to the electrode and the work that the auxiliary potential is in phase with the main potential. Preferably, the potential of the auxiliary supply should be equal to that of the main supply and both potentials should be within safe operating limits. In addition, the auxiliary supply should have a high impedance to correspond to the high impedance of the main supply.

The novel features that I consider characteristic of my invention are set forth generally above. The invention itself, both as to its organization and its method of operation together with objects and advantages thereof will be understood from the following description of specific embodiments when read in connection with the accompanying drawing in which:

Figure 1 is a circuit diagram of a preferred embodiment of my invention;

Fig. 2 is a circuit diagram of a modification of my invention;

Fig. 3 is a circuit diagram of a further modification of my invention;

Fig. 4 is a diagram of a still further modification of my invention; and

Fig. 5 is a diagram showing a transformer used in the practice of my invention.

The apparatus shown in Fig. 1 includes an electrode E and work W between which an arc is to be produced for welding or like purposes. Power is supplied for welding from supply lines L1 and L2 which may be the buses of a commercial alternating current supply, for example, a 230 volt, 60 cycle supply. The apparatus also includes a main transformer T and a reactor Z for adjusting the magnitude of the welding current. The transformer T and reactor Z may be, and preferably are, combined into a transformer-reactor as disclosed in an application Serial No. 357,321, filed May 25, 1953, to Emil F. Steinert, Harry J. Bichsel and Ray Verne Lester. The main transformer T is of the usual high impedance type used in the welding art and has a primary P and a secondary S. Transformer impedance is defined as the ratio, in percent, of the primary potential required to produce rated current with the secondary short-circuited, to the rated primary potential. In the preferred practice of my invention the impedance of the transformer-reactor combination (TZ) should be variable from about 50 to 70%. That is, for an open circuit secondary voltage of 80 the secondary voltage required to produce rated short-circuit current should be variable from about 40 volts to 56 volts.

The primary P of the transformer T is adapted to be connected to the lines L1 and L2 through protective apparatus such as switches S1 and S2 or a circuit breaker.

The secondary S of the transformer T is connected through the reactor Z between the electrode E and work W.

The apparatus further includes an auxiliary transformer AT also of high impedance, a time delay relay RD and another relay R. The relays RD and R each has a normally open contact 5 and 7, respectively, and a coil 9 and 11, respectively. The transformer AT has a primary AP and a secondary AS; its impedance is of the order of 50 or 60%. The transformer AT has a laminated core in the form of a rectangular frame with a rectangular opening. To achieve the desired impedance the primary AP is preferably wound on one opposite leg of the core and the secondary AS on the other. Because of the loose coupling between the primary and secondary, the impedance is high.

Where it is desirable that the impedance of the auxiliary transformer be variable, a transformer such as ATV shown in Figure 5 should be used. In this case the core CV is also of the rectangular frame type. The primary APV is wound on one leg 6 of the core. The secondary is made up of two variable sections 8 and 12, one section wound on the leg 6, or even coaxial with the primary APV, and the other on the opposite leg 14. The adjustable taps 16 and 18, respectively, for the two sections are movable together, one tap 16 changing the turns number for the section 8 in one sense and the other 18 changing the turns number for the section 12 in the opposite sense. A change in the turns number of section 12 changes the impedance of the transformer since the turns of section 12 are loosely coupled to the primary APV. A change in the turns number of section 8 changes the impedance of the transformer at a much lower rate since the section 8 is tightly coupled to primary APV. But the changes in the turns in section 8 compensates for the change in turns of section 12 so that the turns ratio of the transformer and its secondary voltage remains unchanged by the change in impedance.

The primary AP of the auxiliary transformer AT is adapted to be connected to the lines L1 and L2 in parallel with the primary P through the switching components S1 and S2 and through the contact 5. The secondary AS of the auxiliary transformer AT is connected across the welding electrode E and the work W in parallel with the secondary S of the main transformer T. The transformers AT and T are so wound and so connected that the open circuit potential delivered by the secondary AS is in phase with the open circuit potential delivered by the secondary S. Because the transformers T and AT are of high impedance this phase relationship remains unchanged at the beginning of the welding when there is an arc between the electrode E and the work W.

The coil 11 of the relay R is connected across the secondary AS. The coil 9 of the relay RD is adapted to be connected across the secondary AS through a rectifier X which may be of the dry type and through a contact 7 of the relay R.

A capacitor CD is connected across the coil 9 of the relay RD. This capacitor may be, and usually is, variable. The capacitor should be of such magnitude with reference to the resistance of the coil 9 that when it is charged to a potential of the order of the open circuit potential of the secondary S, it discharges to a low potential in a predetermined time interval which is preferably of the order of a one-half second or may be longer or shorter. As a general rule, it is adequate for the purposes of my invention that the time constant of the network consisting of the capacitor and the coil be of the order of this time interval. In accordance with a preferred practice of my invention, it is desirable that the coil 9 be of the high impedance type so that the capacitor may be reasonably small.

In the standby condition of the apparatus disclosed in Fig. 1, that is when the apparatus is ready for but not in use, the switches S1 and S2 are closed and the lines L1 and L2 are energized. At this time, the electrode E is disengaged from the work W and the relays R and RD are initially deenergized. Under such circumstances, the potential of the secondary S is impressed across the coil 11 of relay R and the latter becomes energized, closing contact 7. Current now flows through rectifier X, contact 7 and coil 9 and capacitor CD to energize relay RD and to charge the capacitor. The potential of the secondary AS is then impressed across the electrode and the work W in parallel with that of secondary S. These potentials are substantially in phase and of substantially equal magnitude. Their magnitude should be such as to avoid hazard to operating personnel. If the National Electric Manufacturers Association standard is adopted, this potential should be no greater than 80 volts R. M. S.

When a weld is to be made, the electrode E is brought into contact with the work W and immediately separated from the work. An arc is thus struck between the electrode E and the work W. The cumulative effects of the secondaries S and AS facilitate the starting of the arc. The arc potential is of the order of 20 or 30 volts, and this is insufficient to maintain the relay R energized. The latter immediately drops out opening contact 7 and thus opening the circuit through the coil 9 and capacitor CD. The capacitor having been charged, now discharges through the coil 9 maintaining the relay RD energized and the contact 5 closed so that the auxiliary potential from the secondary AS is still impressed across the electrode E and the work W enabling the arc to be effectively started. At the end of a time interval which is preferably of the order of one-half second, the capacitor CD is discharged to such an extent that the relay 9 is deenergized opening contact 5. The primary of transformer AT is now disconnected from the power, but the welding arc continues to be supplied by the main secondary S so that the welding may proceed.

It is seen that the apparatus shown in Fig. 1 is of simple structure and yet provides effective hot-start means. The structure of the apparatus is such that the hot-start facilities do not increase the hazard to operating personnel.

Apparatus as disclosed in Fig. 1, which I constructed and found to operate satisfactorily, include the following components (values given are approximate):

| | |
|---|---|
| Transformer reactor (TZ) | Variable impedance .28 to 8 ohms. |
| Primary P | 120 turns .102" x .258" aluminum ribbon. |
| Secondary (SZ) | 42+24 turns of two in parallel of .129" x .365" aluminum ribbon. |
| Transformer AT | Impedance 1.6 ohms. |
| Primary AP | 230 turns No. 20 copper wire. |
| Secondary AS | 80 turns No. 15 copper wire. |
| Relay RD | Type PR 1568–1, manufactured by Potter Brumfield. |
| Relay R | Type PR 1538, manufactured by Potter Brumfield. |
| Capacitor CD | 60 microfarads. |
| Rectifier | 6 plates selenium, 75 ma. rating. |

With this apparatus a hot-start current of about 50 amperes is supplied during the ½ second following the start of the welding operation.

The apparatus shown in Fig. 2 is similar to the apparatus shown in Fig. 1. It includes a main transformer T1 having primary P1 with an intermediate tap and a secondary S1 similar to the secondary S of the Fig. 1 modification. The primary AP of the auxiliary transformer AT is in the Fig. 2 modification supplied from potential derived from the intermediate taps and the primary P1 across which the primary AP is directly connected. The secondary AS is adapted to be connected between the electrode E and the work W through the contact 5. The apparatus shown in Fig. 2 as regards the connection of the contact 5 has the advantage that this contact is subject to a lower voltage than the corresponding contact of the Fig. 1 modification.

The Fig. 3 modification is similar to the Fig. 1 modification except that the auxiliary transformer AT1 is of the type having an adjustable primary winding AP1 and an adjustable secondary winding AS1. The secondary AS1 may be so set that the coil 11 of the relay R is supplied at the beginning of the welding operation through a portion of the auxiliary secondary AS1 in addition to the secondary S. In an arrangement such as is shown in Fig. 3, the operation of the relay R may be set more precisely than in the apparatus shown in the other views. In addition, the Fig. 3 modification lends itself with facility to meeting the important requirement of my invention in its specific aspects that the open circuit voltages of the main secondary S and of the auxiliary secondary AS1 must be of substantially equal magnitude and substantially in phase. The adjustment facilities of transformer AT1 enable the proper settings of these voltages to be achieved under conditions of various line voltages.

The apparatus shown in Fig. 4 includes a single time delay relay RDS which performs the same function as the relays R and RD in the other views. This relay RDS is provided with a dashpot 12 which operates so that the relay RDS picks up immediately when potential is supplied to the coil 13 of the relay RDS and drops out only a predetermined time interval after the potential across the coil 13 is disconnected or interrupted entirely. The coil 13 is connected across the auxiliary secondary AS.

In the standby condition of the apparatus shown in Fig. 4, the coil 13 is energized and the relay RDS is actuated so that its contact 15 closes the circuit through the primary AP. Potential is thus available across the secondaries S (shown in the other views) and AS for facilitating starting of a welding operation. When an operator engages the electrode E with the work W and then disengages these components, an arc is struck between the electrode E and the work W, and the current flow through the coil 13 is reduced so that the relay RDS becomes deenergized. After a time interval determined by the dashpot 12, which is sufficient for the effective starting of the welding arc, the relay RDS drops out, opening the circuit through the auxiliary primary AP.

The apparatus shown in Figs. 2, 3 and 4 has the same advantages shown in Fig. 1. It is of simple structure, requires a minimum of servicing and avoids hazard to operating personnel.

While I have shown and described certain specific embodiments of my invention, many modifications thereof are possible. My invention, therefore, is not to be restricted except insofar as is necessitated by the prior art.

I claim as my invention:

1. In an arc welder for welding work with a welding electrode the combination including a main welding circuit for supplying current for welding and having a predetermined open circuit potential; an auxiliary hot-start circuit for supplying current and having an open circuit potential substantially equal to said predetermined potential; means for connecting said first and second circuits in parallel to said electrode and work so that they supply their current cumulatively to said electrode and work; and time delay means to be connected to said electrode and work and responsive to the arc potential between said electrode and work for opening said auxiliary circuit a predetermined time interval after an arc is fired between said electrode and work.

2. An arc welder for welding work with an electrode and including a main welding circuit for supplying current for welding and having a predetermined open circuit potential and means for connecting said main circuit between said electrode and said work; said welder being characterized by an auxiliary hot-start circuit for supplying current and having an open circuit potential substantially equal to said predetermined potential and by time delay means to be connected to said electrode and work and responsive to the potential between said electrode and said work for maintaining said auxiliary circuit connected in parallel with said main circuit ready to supply current cumulatively to said work in the standby condition of said welder and for opening said auxiliary circuit a predetermined time interval after an arc is struck between said electrode and work.

3. An arc welder for welding work with an electrode from an alternating current power supply comprising a main welding transformer having a primary and a secondary, means for connecting said primary to said power supply, means for connecting said secondary between said electrode and said work, an auxiliary hot-start transformer having a primary and a secondary, switch means, actuating means for said switch means of the type which causes said switch means to close instantaneously and permits said switch means to open after a predetermined time delay, means including said switch means for connecting said last-named primary to said supply, means for connecting said last-named secondary between said electrode and said work so that it impresses a potential in phase with the potential impressed by said secondary of said main transformer between said electrode and work, and means responsive to the potential between said electrode and work and connected to said actuating means for said switch means for maintaining said switch means closed when there is a substantial potential between said electrode and work and for permitting said switch means to open when the potential between said electrode and work is the arc potential.

4. An arc welder for welding work with an electrode from an alternating current power supply comprising a main welding transformer having a primary and a secondary, means for connecting said primary to said power supply, means for connecting said secondary between said electrode and said work, an auxiliary hot-start transformer having a primary and a secondary, switch means, actuating means for said switch means of the type which causes said switch means to close instantaneously and permits said switch means to open after a predetermined time delay, means for connecting said last-named primary to said supply, means including said switch means for connecting said last-named secondary between said electrode and said work so that it impresses a potential in phase with the potential impressed by said secondary of said main transformer between said electrode and work, and means responsive to the potential between said electrode and work and connected to said actuating means for said switch means for maintaining said switch means closed when there is a substantial potential between said electrode and work and for permitting said switch means to open when the potential between said electrode and work is the arc potential.

5. An arc welder for welding work with an electrode from an alternating current power supply comprising a main welding transformer having a primary and a secondary, means for connecting said primary to said power supply, means for connecting said secondary between said electrode and said work, an auxiliary hot-start transformer having a first winding and a second winding, switch means, actuating means for said switch means of the type which causes said switch means to close instantaneously and permits said switch means to open after a predetermined time delay, means for connecting said first winding to said supply, means for connecting said second winding between said electrode and said work so that it impresses a potential in phase with the potential impressed by said secondary of said main transformer between said electrode and work, said switch means being interposed in one of said last-named connecting means and means responsive to the potential between said electrode and work and connected to said actuating means for said switch means for maintaining said switch means closed when there is a substantial potential between said electrode and work and for permitting said switch means to open when the potential between said electrode and work is the arc potential.

6. In an arc welder for welding work with a welding electrode the combination including a main welding circuit for supplying current for welding and having a predetermined open circuit potential; an auxiliary hot-start circuit for supplying current, said auxiliary circuit having a high impedance and having an open circuit potential substantially equal to said predetermined potential; means connecting said first and second circuits in parallel to said electrode and work so that they supply their current cumulatively to said electrode and work; and time delay means to be connected to said electrode and work and responsive to the arc potential between said electrode and work for opening said auxiliary circuit a predetermined time interval after an arc is fired between said electrode and work.

7. An arc welder for welding work with an electrode from an alternating current power supply comprising a main welding transformer having a primary and a secondary, means for connecting said primary to said power supply, means for connecting said secondary between said electrode and said work, an auxiliary hot-start transformer having a primary and a secondary, switch means, actuating means for said switch means of the type which causes said switch means to close instantaneously and permits said switch means to open after a predetermined time delay, means including said switch means for connecting said last-named primary to said supply, means for connecting said last-named secondary between said electrode and said work so that it impresses a potential in phase with the potential impressed by said secondary of said main transformer between said electrode and work, and means responsive to the potential between said electrode and work and connected to said actuating means for said switch means for maintaining said switch means closed when there is a substantial potential between said electrode and work and for permitting said switch means to open when the potential between said electrode and work is the arc potential, said last-named responsive means including additional switch means and actuating means for said last-named switch means connected in parallel with said secondary of said auxiliary transformer.

8. An arc welder for welding work with an electrode from an alternating current power supply comprising a main welding transformer having a primary and a secondary, means for connecting said primary to said power supply, means for connecting said secondary between said electrode and said work, an auxiliary hot-start transformer having a primary and a secondary, switch means, actuating means for said switch means of the type which causes said switch means to close instantaneously and permits said switch means to open after a predetermined time delay, means including said switch means for connecting said last-named primary to said supply, means for connecting said last-named secondary between said electrode and said work so that it impresses a potential in phase with the potential impressed by said secondary of said main transformer between said electrode and work, and means responsive to the potential between said electrode and work and connected to said actuating means for said switch means for maintaining said switch means closed when there is a substantial potential between said electrode and work and for permitting said switch means to open when the potential between said electrode and work is the arc potential, said last-named responsive means including additional switch means and actuating means for said last-named switch means connected in parallel with said secondary of said auxiliary transformer.

9. An arc welder for welding work with an electrode from an alternating current power supply comprising a main welding transformer having a primary and a secondary, means for connecting said primary to said power supply, means for connecting said secondary between said electrode and said work, an auxiliary hot-start transformer having a first winding and a second winding, said main and auxiliary transformers, when energized, delivering substantially equal voltages across the secondary and said second winding respectively, said voltages being of a magnitude safe to operating personnel when rated voltage is impressed on said primary and said first winding, respectively, switch means, actuating means for said switch means of the type which causes said switch means to close instantaneously and permits said switch means to open after a predetermined time delay, means for connecting said first winding to said supply, means for connecting said second winding between said electrode and said work so that it impresses a potential in phase with the potential impressed by said secondary of said main transformer between said electrode and work, said switch means being interposed in one of said last-named connecting means, and means responsive to the potential between said electrode and work and connected to said actuating means for said switch means for maintaining said switch means closed when there is a substantial potential between said electrode and work and for permitting said switch means to open when the potential between said electrode and work is the arc potential.

References Cited in the file of this patent

UNITED STATES PATENTS

| | | |
|---|---|---|
| 1,351,815 | Henke | Sept. 7, 1920 |
| 1,640,877 | Brueckner | Aug. 30, 1927 |
| 2,085,242 | Weaver | June 29, 1937 |
| 2,422,280 | Abernathy | June 17, 1947 |
| 2,447,955 | Millholland | Aug. 24, 1948 |